United States Patent [19]

Mathews et al.

[11] Patent Number: 4,571,714
[45] Date of Patent: Feb. 18, 1986

[54] READ BEAM POSITION CALIBRATION

[75] Inventors: Harlan P. Mathews; Paul Romano; Alexander M. Muckle, all of Boulder County, Colo.

[73] Assignee: Storage Technology Partners II, Louisville, Colo.

[21] Appl. No.: 628,685

[22] Filed: Jul. 6, 1984

[51] Int. Cl.$^4$ ............................................. G11B 7/00
[52] U.S. Cl. ...................................... 369/44; 369/111
[58] Field of Search ............... 369/44, 45, 46, 54, 369/58, 32, 33, 41, 275, 111; 346/76 L, 137; 360/77, 78; 365/234, 215; 250/201; 358/342

[56] References Cited

U.S. PATENT DOCUMENTS

| | | | |
|---|---|---|---|
| 4,138,741 | 2/1979 | Hedlund et al. | 365/234 |
| 4,167,024 | 9/1979 | Hamisch | 369/46 |
| 4,283,777 | 8/1981 | Curry et al. | 365/234 |
| 4,290,122 | 9/1981 | Bates et al. | 365/234 |
| 4,432,083 | 2/1984 | Hsieh et al. | 369/44 |
| 4,504,939 | 3/1985 | Eberly | 369/46 |

Primary Examiner—Donald McElheny, Jr.
Attorney, Agent, or Firm—Bryant R. Gold; James R. Young

[57] ABSTRACT

A system and method for optically measuring and maintaining track pitch in an optical storage system. A set of at least four calibration tracks, each having a prescribed track pitch or distance therebetween, are precisely placed on a recording medium of the optical storage system during the manufacture thereof. When this recording medium is subsequently inserted into the optical storage system, the track pitch of a select pair of the calibration tracks is optically measured by maximizing the amplitude of a data read radiation beam, and an offset signal is generated in response to this measurement. This offset signal is used within the optical storage system for controllably positioning a second radiation beam with respect to a first radiation beam, the first radiation beam being directed to follow a previously written data track on the recording medium. The offset signal may be stored so that it need only be generated during an initialization or calibration mode of the optical storage system, and thereafter be readily available for positioning the second radiation beam relative to the first radiation beam. The select pair of calibration tracks may be an inner pair, having additional tracks adjacent both sides thereof, or an outer pair, having an additional track adjacent only one side thereof; thereby having included in the offset signal the optical effects of having additional data tracks adjacent or not adjacent the respective sides of the pair of calibration tracks whose track pitch is being measured.

17 Claims, 11 Drawing Figures

READ BEAM POSITION CALIBRATION

BACKGROUND OF THE INVENTION

The present invention relates to data read beam position calibration systems, and more particularly to a data read beam position calibration system that may be used in an optical storage system to accurately set and maintain a position for the data read beam used for reading data tracks placed on a record carrier used within the optical storage system.

An optical disk storage system of the type to which the present invention pertains comprises an optical drive into which a recording medium or record carrier is inserted. Data is stored by marking the record carrier, such as a rotating disk, with a beam of radiant energy (typically a laser beam) that is modulated in some fashion by the data to be stored. To write or store data on the record carrier, the modulated beam is directed to and focused at a desired point on the surface of the record carrier and relative motion is created between the beam and the record carrier. Where the record carrier is a disk, this relative motion is typically created by rotating the disk. As the disk rotates under the desired point, a "data track" is created by the marks made on the disk by the modulated beam. If the desired point at which the beam is focused is held stationary, a circular data track is created on the disk that is centered about the axis of rotation of the rotating disk. Additional data tracks, each concentric with the others, can be created by turning the write beam off, radially moving the point at which the write bleam is focused to a new location, holding this point stationary at the new location, and turning the modulated write beam back on. Alternatively, if the point at which the write beam is focused is radially moved with respect to the disk as the modulated write beam makes marks thereon, a spiraling data track is created on the surface of the disk.

Whether the data tracks are concentric or spiraling, the available surface area on the disk is most efficiently used when the data tracks are spaced together as close as possible. The radial distance between adjacent data tracks is called the "track pitch". Accurately maintaining the track pitch at a desired value, especially where the track pitch must be kept small so as to efficiently make use of the storage space available on the disk, has presented a significant obstacle in the development of high storage capacity optical disk storage systems.

Data tracks are typically read by directing a data read beam of radiant energy to a desired data track on the disk. This data read beam typically has different parameters associated therewith than does the write beam (such as intensity and/or wavelength), thereby ensuring that the data read beam does not mark the disk in the same manner as the write beam is designed to mark the disk. The data read beam is either reflected from the surface of the disk, or passes therethrough (if the substrate of the optical disk is sufficiently transparent to allow the beam to pass therethrough), and the intensity of the data read beam is modulated in accordance with the data marks that have been previously written in the data track by the write beam. The data marks typically comprise a sequence of reflectivity-high/reflectivity-low (or transmissivity-high/transmissivity-low) marks that modulate the reflected or transmitted data read beam in accordance with the pattern of the stored data. Once modulated, the data read beam is directed to a suitable optical detector where a modulated data signal is generated. The data is extracted from this signal using conventional demodulation techniques.

Whether the optical drive is reading or writing data, it is critically important to be able to set and maintain a prescribed track pitch. When writing data, the newly written data track must be spaced the prescribed track pitch distance from a previously written data track or other suitable reference. When reading data, the prescribed track pitch distance must be known so that the optical drive can direct the data read beam to a desired track location on the surface of the disk as measured from a known location on the disk, such as an adjacent track. Moreover, if interchangeability of record carriers from optical drive to optical drive is to be preserved—a condition that must exist if the record carrier or disk is removable from the optical drive—the prescribed track pitch must be maintained from one record carrier to another, and from one optical drive to another. This is not an easy task to achieve given the numerous variations that naturally occur in the electrical and optical components used within any optical storage system.

To illustrate some of the difficulties encountered, when reading data tracks on a record carrier, the desired track pitch is typically achieved by positioning the data read beam a prescribed distance from a reference beam that is following a previously written track. Hence, the goal is that the data read beam will be held at a constant distance from the next preceding data track. In order to maintain the prescribed distance between the two beams, however, some sort of control system must be used to keep the two beams separated the desired amount. While this goal is easily stated, the realization thereof is not easily achieved.

A significant first hurdle is to initially set the two beams so as to have the desired spacing therebetween. This is not a trivial task because of the nature of the elements involved. While galvonometer controlled mirrors and related optical components can be used to position one beam relative to another in response to a control signal, the initial value of the control signal must still be determined. Unfortunately, because of differences in the electrical and optical components from one optical drive to another optical drive, this control signal will not necessarily be the same for all optical drives.

Even assuming that the two beams can be initially spaced apart the prescribed distance, a difficulty arises in maintaining this distance. Both the electrical signals generated to set the distance, and the electromechanical elements used to respond to these signals, will not be perfectly stable over time and a range of environmental and other conditions. Moreover, the optical elements used within the drive to direct the beams to and from the surface of the record carrier will likewise exhibit some variations over time and environmental conditions, and especially will exhibit variations from optical drive to optical drive.

One approach for initially setting and maintaining a desired track pitch, as described in copending U.S. patent application Ser. No. 06/628,686, filed concurrently herewith, assigned to the same assignee as is this application, is to place a pair of calibration tracks having the desired track pitch therebetween on the disk or record carrier during the manufacture thereof. The track pitch of these calibration tracks is then optically measured when the record carrier is first inserted into the optical storage system (and at calibration intervals thereafter), in order to define an offset signal that defines the prescribed track pitch for that particular storage system, including the particular combination of electrical and optical elements found therein. This offset signal is thereafter used to set the desired spacing between the various beams used within the optical storage system to insure that the desired track pitch is maintained. Unfortunately because the measurement of the two calibration tracks is made with tracking read beams and not with the data read beam, the track pitch measurement may not position the read beam exactly over the track. In addition, because of optical and electrical variances and tolerances, the position of the data read beam with respect to the tracking read beam may vary from drive to drive and may vary over time.

Hence, there is a need in the art for a data read beam position calibration system that can initially set and maintain a desired track pitch in an optical storage system and then adjust the data read beam position to compensate for variances of the data read beam position with respect to the track pitch calibration beams. The present invention addresses that need.

SUMMARY OF THE INVENTION

It is an object of the present invention to provide a data read beam position calibration system for use with an optical storage system that provides a way to accurately set and maintain the position of the data read beam used to read data from the recording medium with reference to the previous adjacent track or with reference to the track being read.

It is another object of the present invention to provide such a data read beam position calibration system that provides an offset signal that can be used by the optical storage system to read data tracks at a prescribed pitch.

It is a further object of the present invention to provide such a data read beam position calibration system that sets and maintains the data read beam position regardless of the particular optical drive within which the recording medium is inserted, thereby ensuring that any record carrier may be used with any optical drive of the optical storage system.

Another object of the present invention is to provide such a data read beam position calibration system that is essentially immune from variations that may occur in the electrical, electromechanical, and optical components used within the optical drive, which variations occur over time and a range of environmental and other external conditions.

The above and other objects of the present invention are realized by a data read beam position calibration system that utilizes the optical read and write components of an optical drive in conjunction with a set of calibration data tracks that are previously written on a recording medium, which recording medium is designed to be removably inserted into the optical drive. The calibration tracks are precisely spaced apart, using precision optical equipment available only at the manufacturing site of the recording medium, so as to exhibit the prescribed track pitch. Advantageously, the calibration tracks used to provide the optical track pitch measurement have additional calibration tracks placed adjacent thereto to provide the same background pattern that the optical system encounters when reading data. When the recording medium is first inserted into the optical drive, a calibration mode is initiated during which this data read beam position calibration is optically measured. An offset signal representative of this optical measurement is generated and stored. This offset signal is subsequently used within the optical drive to help control the desired reading operations.

During a read operation, the offset signal is used to position a first data read beam with respect to an $(N-1)^{th}$ data track (a previously written data track that is adjacent to an $N^{th}$ data track, the $N^{th}$ data track being the desired data track to be read) so that a second data read beam, positioned a fixed distance from the first data read beam for that particular optical drive, will track and follow the $N^{th}$ data track. The drive may initiate the calibration mode as often as necessary to update the value of the offset signal.

Advantageously, the data read beam position measurement of the calibration data tracks is realized using the set of data read beams already available within the optical drive to follow the $(N-1)^{th}$ and $N^{th}$ data tracks. The data read beams associated with this set of data read beams have a substantially fixed relationship therebetween for a given optical drive. However, this relationship will vary from optical drive to optical drive, and may vary slightly over time and changes in environmental conditions for a given optical drive. Hence, by regularly measuring the track pitch of the calibration data tracks with this set of data read beams and then measuring the data read beam position, any such variations in position of the beams will be factored out and an accurate offset signal for that particular drive at that particular time can be generated.

BRIEF DESCRIPTION OF THE DRAWINGS

The above and other objects, features, and advantages of the present invention will be more apparent from the following more particular description thereof, presented in conjunction with the following drawings wherein.

DETAILED DESCRIPTION OF THE INVENTION

Figure 1:
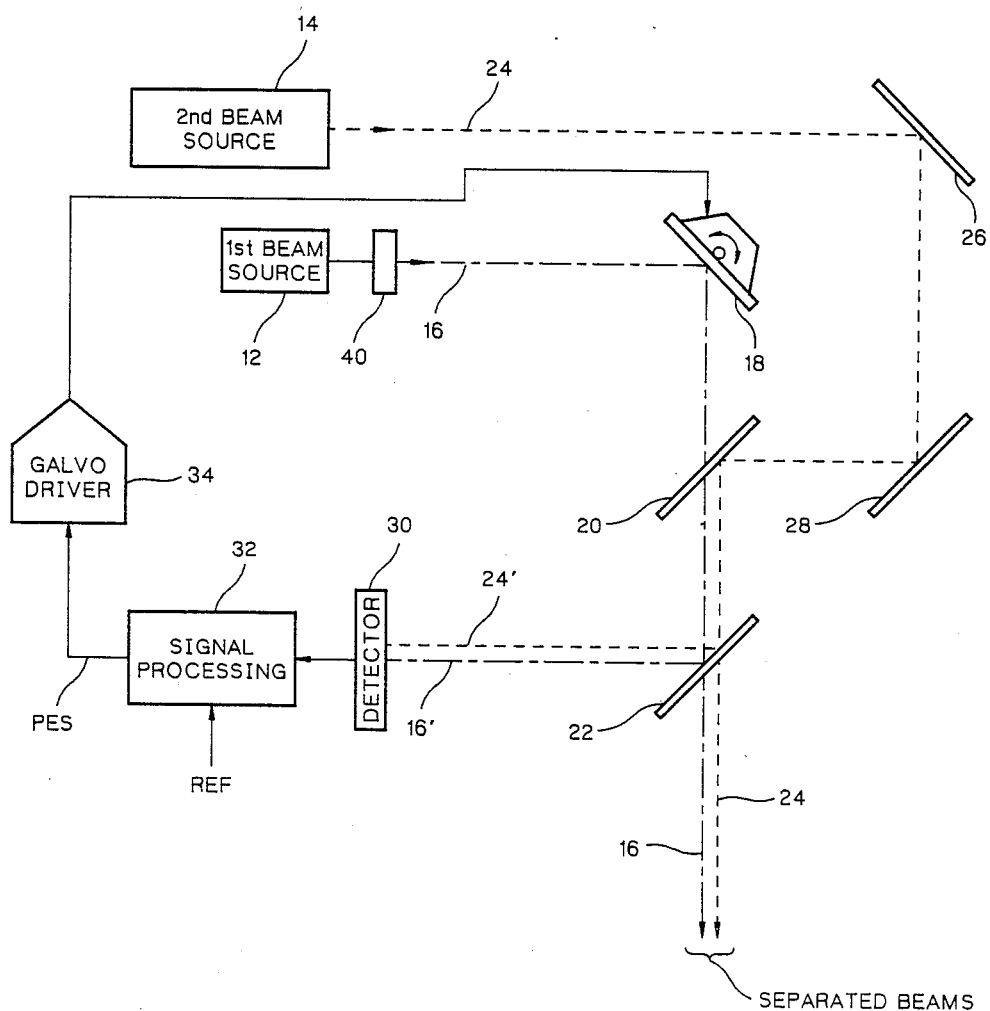
FIG. 1 is a simplified block diagram of a beam alignment system used to position one beam a desired distance from another beam.

The following description is of the best presently contemplated mode of carrying out the invention. This description is not to be taken in a limiting sense, but is made merely for the purpose of describing the general principles of the invention. The scope of the invention should be determined with reference to the appended claims.

The invention is best understood by referring to the drawings, wherein like numerals are used to refer to like parts throughout. Further, the invention will be better understood if some basic information is first given with respect to beam alignment systems and optical storage systems.

Referring first to FIG. 1, there is shown a simplified block diagram of a beam alignment system used to position two beams in a desired relationship. As described more fully below, such a beam alignment system may be used with the data read beam position system of the present invention in order to position a data read beam a prescribed distance from a track following beam so as to realize a desired track pitch. A first beam source 12 and a second beam source 14 respectively generate radiation beams that follow the paths indicated. The beam from the first beam source 12 is represented by the dashed single-dot line 16. As indicated in the figure, the beam 16 is reflected off of a galvonometer controlled mirror 18, passes through a beam combiner 20, and a beam splitter 22, and continues along an optical path in the direction indicated. (It is to be understood that in connection with FIG. 1, when reference is made to a beam, such as the beam 16, that the path which the beam is following may also be referred to as the optical path 16 along which the beam 16 is traveling.)

The second beam source 14 also generates a beam 24, represented as a dashed line in FIG. 1, which follows a path that reflects off of a mirror surface 26, a mirror surface 28, and a surface of the beam combiner 20. At the beam combiner 20, the path of the beam 24 is substantially parallel to the path of the beam 16, although variations in the angle of the galvonometer controlled mirror 18 may cause the beam 16 to be somewhat out of parallel with the beam 24. However, as those skilled in the art will recognize, the angular displacement of the galvonometer controlled mirror 18 is very slight, and the two beams 16 and 24 are considered to be following the same optical path even though one may not be truly parallel to the other. Moreover, conventional means may be used, such as prisms, to bend a beam of light by an appropriate amount to make it parallel to another beam.

As the beam 16 passes through the beam splitter 22, a portion of the beam 16, represented as 16', is split off and directed to a detector 30. Likewise, a portion 24' of the beam 24 is split off from the beam 24 as the beam 24 passes through the beam splitter 22. The split off portion 24' is also directed to the detector 30. Advantageously, the alignment between the split off beams 16' and 24' is proportional to the alignment of the beams 16 and 24 as these beams pass through the beam splitter 22. This means that the alignment between the beams 16' and 24' at the point where these beams strike the surface of the detector 30 is either the same as, or proportional to, the alignment between the beams 16 and 24 at the point where the beams 16 and 24 pass through the beam splitter 22. Because radiation beams, absent external forces, travel in a straight line, this means that the alignment between the beams 16' and 24' at the surface of the detector 30 will be proportional to the alignment between the beams 16 and 24 anywhere along the common path shared by the beams 16 and 24.

The detector 30 measures the alignment between the two beams 16' and 24'. This alignment measurement is processed by signal processing circuitry 32 where an error signal is generated. The error signal represents the difference between the measured beam alignment and a desired alignment. As such, the error signal is referred to as a position error signal (PES). After being appropriately amplified and buffered in a galvodriver 34, the PES is used to steer the galvonometer controlled mirror 18. Conventional servo control techniques are used to drive the PES signal to zero, thereby forcing the beam 16 to assume a desired alignment with respect to the beam 24. Further details associated with the beam alignment system shown in FIG. 1 may be found in pending U.S. patent application Ser. No. 06/628,686, assigned to the same assignee as is this application, which application is incorporated by reference herein in its entirety.

Figure 2:
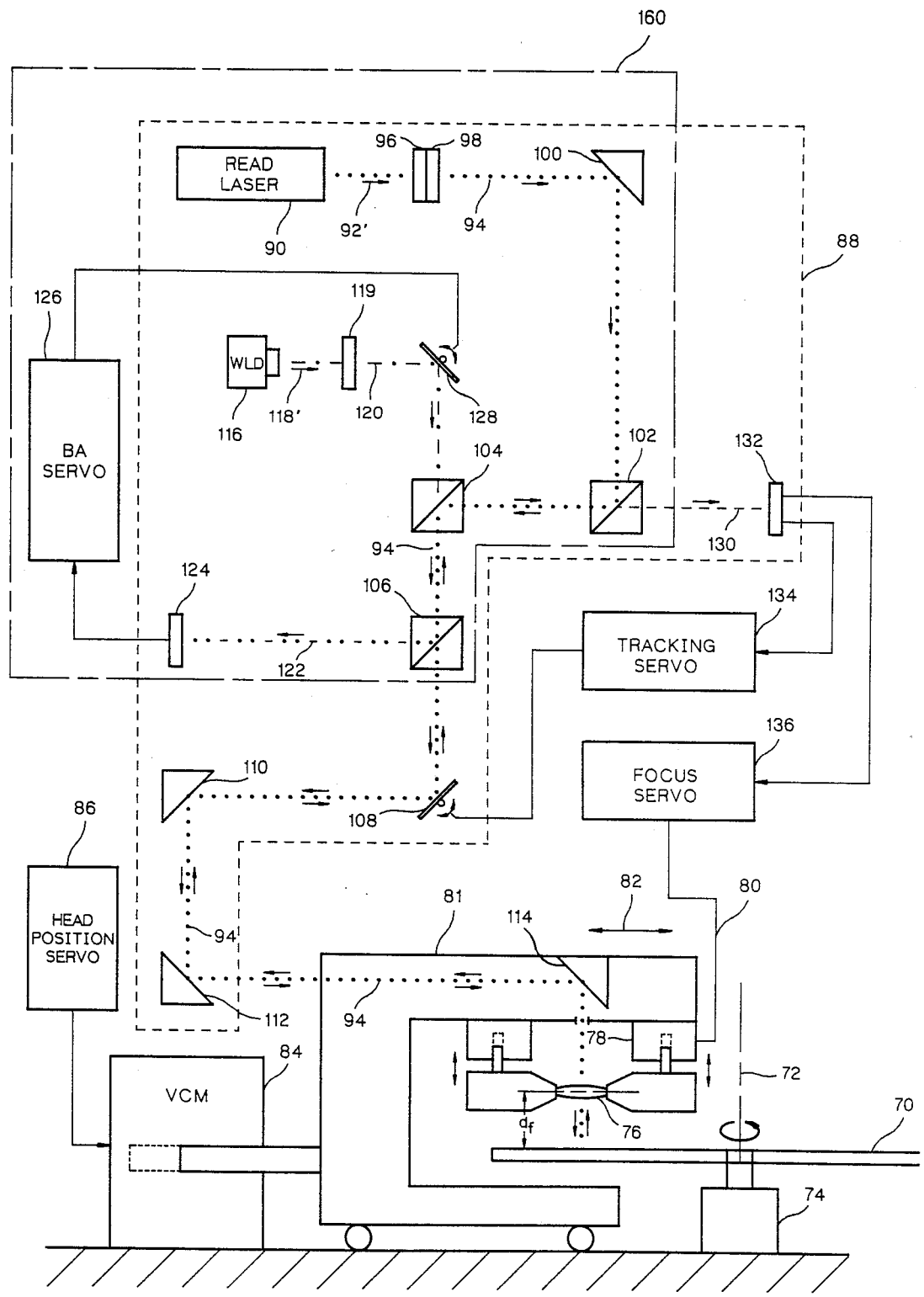
FIG. 2 is a block diagram of an optical storage system, and shows the principal optical elements found in the optical drive.

Referring next to FIG. 2, a block diagram of an optical disk storage system is shown. The beam alignment system of FIG. 1 is included in FIG. 4 as those elements enclosed within the dashed line 160, and this alignment system is used in such a storage system to provide a desired alignment between a tracking beam, a read beam and a write beam. The optical disk storage system includes a recording medium or record carrier 70 and an optical drive (all of the elements in FIG. 2 except the carrier 70). The record carrier includes radiation sensitive layers placed thereon that can be marked by a beam of radiant energy. In the configuration shown in FIG. 2, the recording medium 70 is an optical disk that is rotated about a rotational axis 72 by a motor 74. (Other means could be used, of course, to create relative motion between the record carrier and a beam of radiant energy.) An objective lens 76 is disposed adjacent to the surface of the disk 70. The distance $d_f$ from the lens 76 to the surface of the disk 70 is controllable by focusing means 78, which focusing means responds to a focus control signal appearing on signal line 80. The focus means 78 may be realized with any suitable means for achieving the desired motion, such as a voice coil motor (VCM), or the like.

The lens 76 and focusing means 78 are mounted to an optical head 80 that is slidably mounted for radial movement in the direction of the arrow 82 with respect to the record carrier or disk 70. This movement is typically realized by means of a VCM 84 that positions the optical head 80 in response to a suitable control signal generated by a head position servo system 86. The details of the head position servo 86 are not important to the present invention, but a suitable positioning servo is described in co-pending application Ser. No. 438,133, filed Nov. 1, 1982, assigned to the same assignee as is the present application.

The optical components used to generate the beams that are directed to the surface of the disk 70 are mounted on a stationary optical plate 88. These components include a read laser source 90 that generates a data read beam 92'. The beam 92' follows an optical path 94 indicated in FIG. 2 as a dotted line. As will be explained more fully below, the data read beam 92' is diffracted into a plurality of beams by optical gratings 96 and 98. All of these beams are parallel having a fixed spacing therebetween as determined by the gratings 96 and 98, and they all follow the dotted line path 94. This path 94 directs the beams off of a mirrored surface 100, to a beam separator 102, to a beam combiner 104, through a beam splitter 106, off of a galvonometer controlled mirror 108, off of fixed mirrored surfaces 110 and 112, and into the optical head 81 where the path further includes at least one additional mirrored surface 114 which directs the beams following the path through the objective lens 76 onto a desired point of the surface of the rotating disk 70.

A write laser diode 116 generates a write laser beam 118' that follows an optical path 120 indicated by the dashed single-dot line in FIG. 2. This write path 120 joins the primary beam path 94 (dotted line) at the beam combiner 104. Hence, from the point of the beam combiner 104 to the surface of the disk 70, the path 94 is shared by both the data read beams and the write beams. (The small arrows on either side of the optical path 94 indicate the direction that the various beams are traveling at that point along the path 94.).

The beam splitter 106 splits off a portion of the beams traveling through the path 94 and directs them along an optical path 122, represented in FIG. 2 by a dashed double-dot line. This path terminates at a beam alignment detector 124. The detector 124 is positioned so that only beams split off from the write beam 118 and a desired data read beam are mapped onto the surface of the detector 124. The position of the spots appearing on the detector 124 are measured and processed in a beam alignment servo 126. The beam alignment servo 126 provides a control signal to a galvonometer controlled mirror 128 which steers the write beam 118 as it is fed into the optical path 94 at the beam combiner 104.

The data read beams that strike a surface of the disk 70 are reflected back along the optical path 94 all the way back to the beam separator 102. At this point, the reflected beams are directed along a path 130, represented in FIG. 2 as a dashed line. This path 130 directs these beams to a second optical detector 132. This detector 132 serves two functions: (1) it detects the position of a first group of data read beams that fall upon a surface thereof and this information is fed to a tracking servo 134, which tracking servo provides the control signal for steering the galvonometer controlled mirror 108; and (2) it detects whether or not the beams that are falling upon the surface of the disk 70 are in focus, and feeds this information to focus servo circuitry 136, which focus servo 136 generates an appropriate control signal directed to the focusing means 78 over signal line 80 in order to place and maintain the lens 76 at a desired in-focus position. As can be seen from FIG. 2, the galvo mirror 108 jointly steers all of the beams that are traveling along the optical path 94 to and from the surface of the disk 70. Hence, the tracking servo 134 jointly steers all of the beams so that they strike the surface of the disk 70 at a desired location. The focus servo 136 ensures that all these beams are properly focused when they strike the surface of the disk 70.

Figure 3:
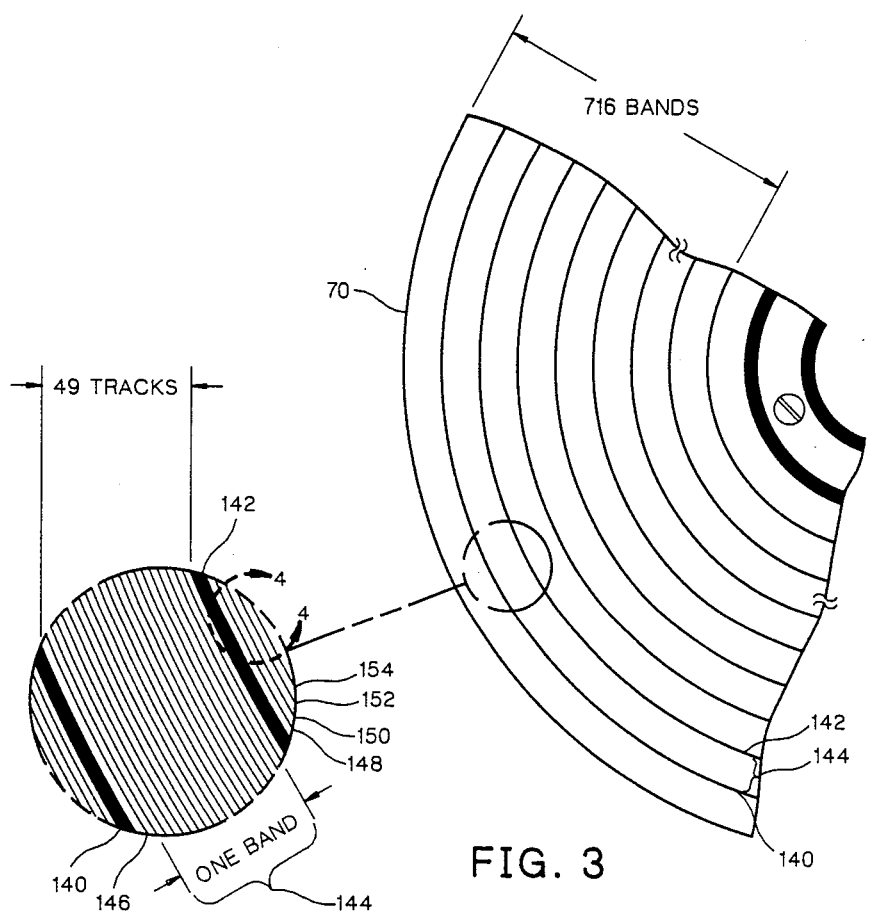
FIG. 3 is a partial top plan view of an optical disk or recording medium of the type used within the optical storage system of FIG. 2, and includes an expanded view of a portion of the surface of the disk to illustrate how the data tracks are arranged thereon.
Figure 4:
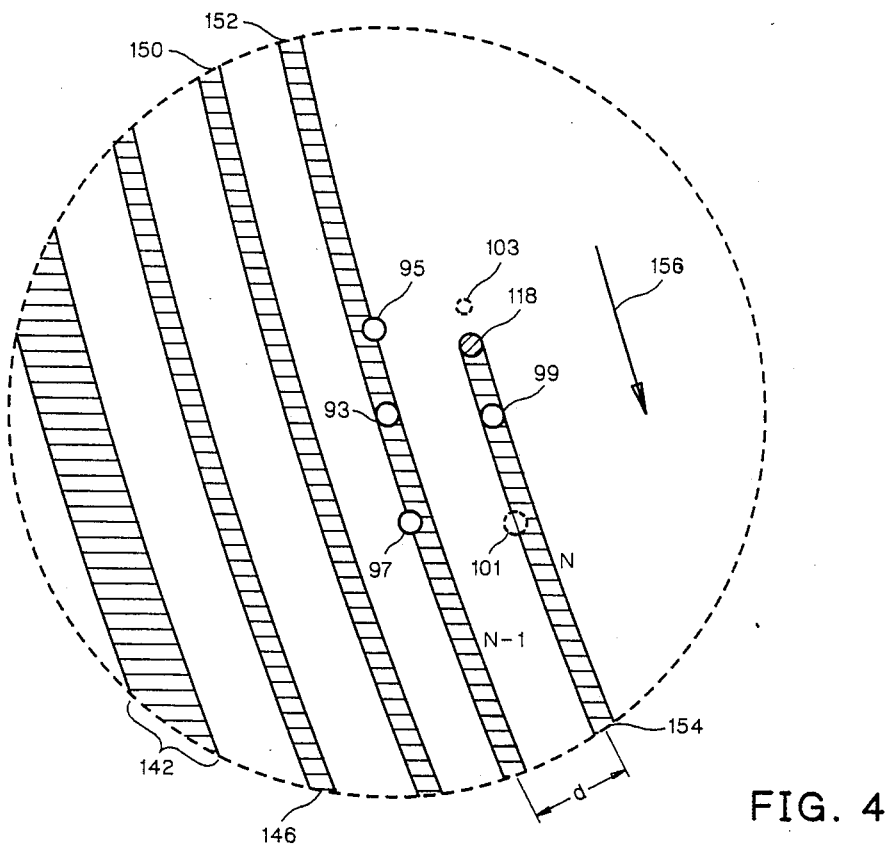
FIG. 4 is an enlarged view of the disk surface area bounded by the circular dashed line 4—4 in FIG. 3, and shows the beam spot pattern created by a plurality of radiation beams as this spot pattern is controllably positioned to follow the $(N-1)^{th}$ track as the $N^{th}$ track is written.

In order to better understand the data read beam position calibration system of the present invention and how it relates to the operation of the optical disk storage system illustrated in FIG. 2, reference is now made to FIGS. 3 and 4 in order to illustrate a preferred format of the optical disk 70. In FIG. 3, a portion of the disk surface 70 is illustrated. This disk is divided into a large number of concentric data bands comprising a plurality of data tracks into which data may be stored. Concentric coarse servo tracks separate one data band from another. Two such coarse servo tracks 140 and 142 are illustrated in the enlarged portion of FIG. 3. A first data track 146, adjacent to the coarse servo track 140, is previously written on the disk during the manufacture thereof and is used to identify the data band 144. This first data track in the data band is referred to as the "home address track". As illustrated in the figure, the data band 144 contains a large number of data tracks. In the preferred embodiment, 49 tracks, including the home address track 146, are included in a data band. Further, there are 716 such bands included on a given disk 70.

Referring to FIG. 4, an expanded view of a portion of the disk surface 70 encircled by the dashed line 4—4 in FIG. 3 is shown. This expanded view includes a portion of a coarse servo track 142, a home address track 46, two data tracks 150 and 152, and a partially written data track 154. In FIG. 4, it is assumed that the disk is rotating in the direction indicated by the arrow 156.

Included in FIG. 4 are a pattern of seven spots, representing the location at which the various beams strike the surface of the disk after following along the optical path 94 (FIG. 2). A write spot 118 is directed to a desired point on the disk so as to create the write track 154 as the disk rotates in the direction indicated by the arrow 156. The data read beam 92' is split into 6 beams by the defraction gratings 96 and 98 (FIG. 2), and these beams form a spot pattern as illustrated in FIG. 4. (Note: A spot results from a beam that is directed to the surface of the disk. Hence, in the description that follows, the terms "beam" and "spot" are closely interdependent.) A first data read spot 93 is centered on the previously written data track 152. Track following spots 95 and 97 are positioned in front and behind the data read beam 93 and offset so as to provide a dual beam tracking function as is known in the art. Basically, in accordance with the teachings of the art, the detector 132 (FIG. 2) is able to detect when the spots 95 and 97 are half on and half off of the track 152 which they are following. If they are not exactly half on and half off of the track, an error signal is generated by the track servo 134 to steer the spots in an appropriate direction to make them follow the track 152. The data read spot 93 is positioned midway between the tracking spots 95 and 97, thereby causing the data read spot 93 to follow the data track 152. (The previously written data track 152 that is being followed by these tracking spots 95 and 97 will hereafter be referred to as the (N−1)th track.) An additional data read spot 99 is positioned relative to the spots 93, 95, and 97, so as to fall behind the write spot 118 a short distance. This data read spot 99 is used to read the data written in the track 154 immediately after it has been written therein by the write beam so that if an error is detected the incorrect data may be flagged or marked and the data may be correctly written over again.

Two additional tracking spots 101, 103 are positioned relative to the data read spot 99 in a configuration that is similar to the positioning of the tracking spots 95 and 97 with respect to the data read spot 93. These "auxiliary" read tracking spots 101, 103 serve no purpose when a track is being written by a write spot as shown in FIG. 4. Hence, the spots are shown only as dashed circles. However, these spots serve a very important purpose during a track pitch calibration mode of the optical disk storage system, as explained below.

Figure 5:
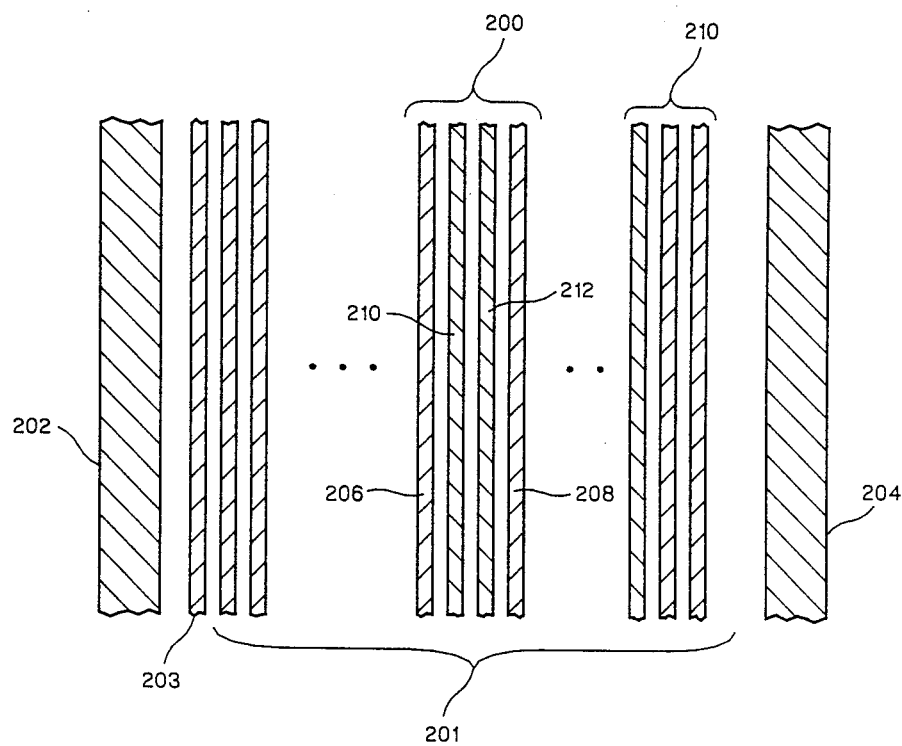
FIG. 5 is a top view of a portion of a selected band of the disk of FIG. 3, and shows the calibration data tracks that form a part of the present invention.

The optical disk 70 used in the optical storage system shown in FIG. 2 is preferably a removable disk that may be used in any compatible optical disk drive. Because the various optical drives cannot be identically alike, there will be variations from drive to drive with respect to the alignment of the read spots created by passing the data read beam 92' through the optical gratings 96 and 98. Moreover, some of the components used within the stationary optics plate 88 will drift somewhat over time and with variations in temperature and other environmental factors. Therefore, a constant fixed stable pattern between the spots 93, 95, 97, 99, 101, and 103 cannot be guaranteed from drive to drive and over a period of time. To account for these slight variations that will occur, and in order to guarantee a fixed track pitch distance, d (see FIG. 4), the data read beam position calibration system of the present invention is employed. According to the present invention, one band 201 on the disk 70 has previously written thereon, during the manufacture of the disk, a plurality of calibration data tracks 200 that are precisely spaced at the desired track pitch. A partial view of this special calibration band 201 is illustrated in FIG. 5. As with other bands on the disk, this band is bounded by coarse servo tracks 202 and 204, and a home address track 203 is also included. In the preferred embodiment of the present invention, the calibration band 201 is the outer-most band on the disk, although the band could be placed anywhere on the disk and still serve the same function. The calibration data tracks 200 lie approximately in the center of the calibration band 201. In accordance with a preferred embodiment of the present invention, at least 4 calibration data tracks are provided. The outer two calibration tracks 206 and 208 are written with the data pattern 33 H (hexadecimal), repeating. The inner two data tracks 210 and 212 are written with the data pattern 92 H, 49 H, 24 H (hexadecimal), repeating. These data patterns are not critical, and any repeating data pattern could be employed, so long as the same patterns are used on all disks for the same tracks.

In accordance with one embodiment of the invention, a second group of calibration tracks 210 may be placed towards one end of the calibration band 201, or within another band on the disk 20. This second group of calibration tracks 210 is characterized by having only three data tracks therein, and by having no data tracks adjacent one side thereof. The group of calibration tracks 210 could be included within the group of calibration tracks 200 providing no data track is written adjacent track 208 (or 206).

The calibration data tacks are written on the disk surface during the manufacture thereof so as to have a precise track pitch spacing therebetween. In the preferred embodiment, the data tracks have a track width of 0.8±0.1 micrometers (microns), and a track pitch of 1.65±0.09 microns. The calibration data tracks are written using precision optical servo writing equipment adapted for use in a disk manufacture facility. Such equipment is expensive, bulky, and difficult to use without proper training and a controlled environment. In short, the precision nature of this embodiment makes it ill-suited for any use other than a manufacturing or laboratory use. Hence, the techniques used in such equipment to achieve a precise track pitch, which techniques are known in the art, are not available for use in a less complex and less expensive optical drive of the type contemplated for use with the present invention.

Figure 6A:
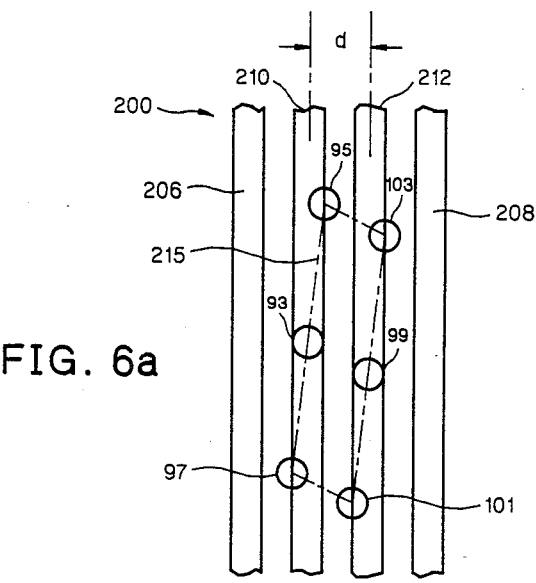
FIGS. 6a and 6b show aligned and misaligned conditions respectively between the data read beam spot pattern of FIG. 4 and the calibration data tracks of FIG. 5.
Figure 6B:
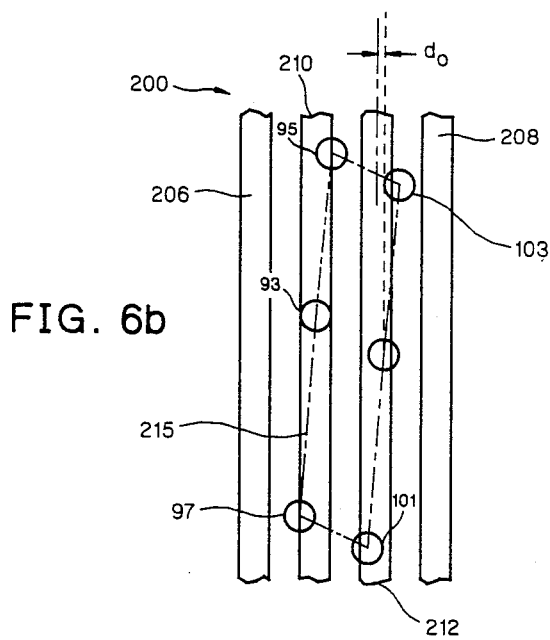

Referring next to FIGS. 6a and 6b, the data read beam spot configuration is shown superimposed on the calibration data tracks 200. When the disk is first inserted into an optical drive, such as shown in FIG. 2, the optical head 80 is positioned such that the six read spots 93, 95, 97, 99, 101, and 103 (which spot configuration is hereafter referred to as the spot configuration 215) are positioned over the calibration tracks 210 and 212. These six read spots will essentially have a fixed relationship (i.e., a fixed spot configuration 215) for any given optical drive. However, this spot configuration 215 will vary somewhat from drive to drive, and may vary within a given drive over time and with changes in environmental conditions. Hence, when the spots of the configuration 215 are superimposed over the calibration tracks, they may or may not align therewith.

FIG. 6a depicts an aligned condition. That is, in FIG. 6a the dual tracking spots 95 and 97 are half-on and half-off of the track 210; dual tracking spots 101 and 103 are half-on and half-off of the track 212 and the data read spot 99 is centered over the track 212. FIG. 6a thus illustrates a "zero offset" condition wherein the tracking spot configuration created by the data read beams is perfectly aligned with the desired track pitch. In such a zero offset condition, no adjustments need be made to the subsequent positioning of the spot configuration relative to a previously written track in order to achieve a desired track pitch between the data read 93 and 99. Hence, if writing, the write beam 118' (FIG. 4), and consequently the write spot 118, can be controllably positioned relative to either data read spot 93 or 99, using a beam alignment system as described previously in connection with FIG. 1, in order to ensure that the desired track pitch is achieved. If reading, either spot 93 or 99 will be aligned with either the $(N-1)^{th}$ or $N^{th}$ data track, respectively, so that either data read spot can be used to read the data in it's respective data track.

In FIG. 6b, the spot configuration 215 does not align with the calibration tracks 200. (FIG. 6b only illustrates one of many possible misalignment situations that could exist. However, all are handled in the same fashion.) In such a situation, the entire spot configuration 215 is moved until the first group of tracking spots 95 and 97 are aligned (half-on and half-off) with the calibration data track 210. Then the "misalignment" or "track pitch offset" between the second group of tracking spots 101 and 103 and the calibration data track 212 is measured.

Following this procedure, the entire spot configuration 215 is moved iteratively, using small increments in both directions, until the signal amplitude from the data read spot 99 is at the maximum possible value. Then a second offset value or "data read beam position effect" is measured. This data read beam position offset is used to direct the data read beam to the exact position after the track pitch offset is used for initial alignment. This offset is represented as the distance $d_o$ in FIG. 6b.

Figure 7:
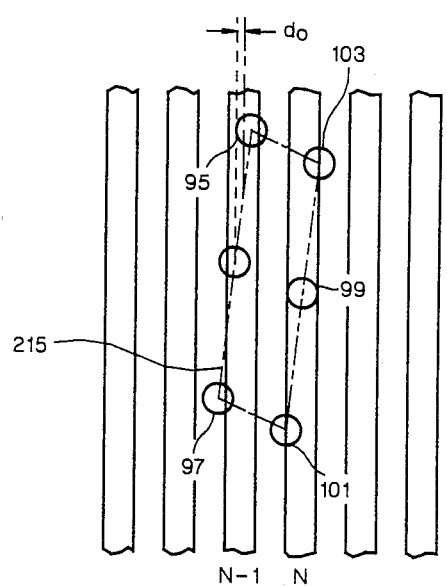
FIG. 7 illustrates how an offset measured for a condition such as that shown in FIG. 6b could be used in reading the $N^{th}$ track as the $(N-1)^{th}$ track is followed.

FIG. 7 illustrates how the track pitch offset and the data read beam position offset may be used to read data in accordance with the prescribed track pitch. Tracking spots 95 and 97 are deliberately offset from the $(N-1)^{th}$ track by an amount commensurate with the measured offset $d_o$, thereby causing the data read spot 99 to be aligned with the $N^{th}$ track to read the data written therein.

In accordance with the present invention, when the radiation energy is reflected off of the surface of the disk back to a detector, a Gaussian beam intensity distribution is associated with this reflected energy. Moreover, because the tracking spots or beams 95, 97, 101, and 103 are offset from the center of the tracks, the reflected intensity distribution is affected by the presence of an adjacent track or the absence of an adjacent track. For example, it can be shown that for spot 101 (FIG. 6a), the influence of the $N^{th}$ track (track 212) is $0.56I_o$, where $I_o$ is the intensity of the reflected beam if it were centered on the data track 212. The influence of the $(N-1)^{th}$ track (track 210) on spot 101 is $0.04I_o$. Hence, spot 101 is influenced a total of $0.60I_o$. This same problem also occurs when measuring the amplitude of the data read spot 99 to calculate the data read beam position offset. In order to balance this reflected energy with respect to spot 103 and spot 99, track 208 is placed immediately adjacent thereto. Without the presence of adjacent track 208, an imbalance condition would be created that could translate to a mis-calibrated offset during any subsequent read operation. Track 206 is added adjacent to track 208 for the same reason, i.e., to insure that the reflected energies from spots 95 and 97 are equal.

The presence of the track 208 adjacent to the calibration track 212, (FIG. 6a), while preventing mis-calibrated offsets for subsequent read operations of a track N when a track N+1 is present, it will cause mis-calibrated offsets for subsequent read operations if no N+1 track has been written on the disk. To prevent mis-calibrated offsets from occurring, therefore, regardless of whether an N+1 track is adjacent to the $N^{th}$ track being read, two groups of calibration tracks are provided, as discussed above. A first group (e.g., calibration tracks 210, 212 in FIG. 5) has outside tracks on either side thereof and is used to define the offset for subsequent read operations when an N+1 track is present. A second group (e.g., calibration tracks 208, 212 in FIG. 5, assuming no track is placed to the right of track 208) has no outside track on one side thereof, but does have an outside track on the other side. This latter group is used to define the offset for subsequent read operations when no N+1 track is present.

Figure 8:
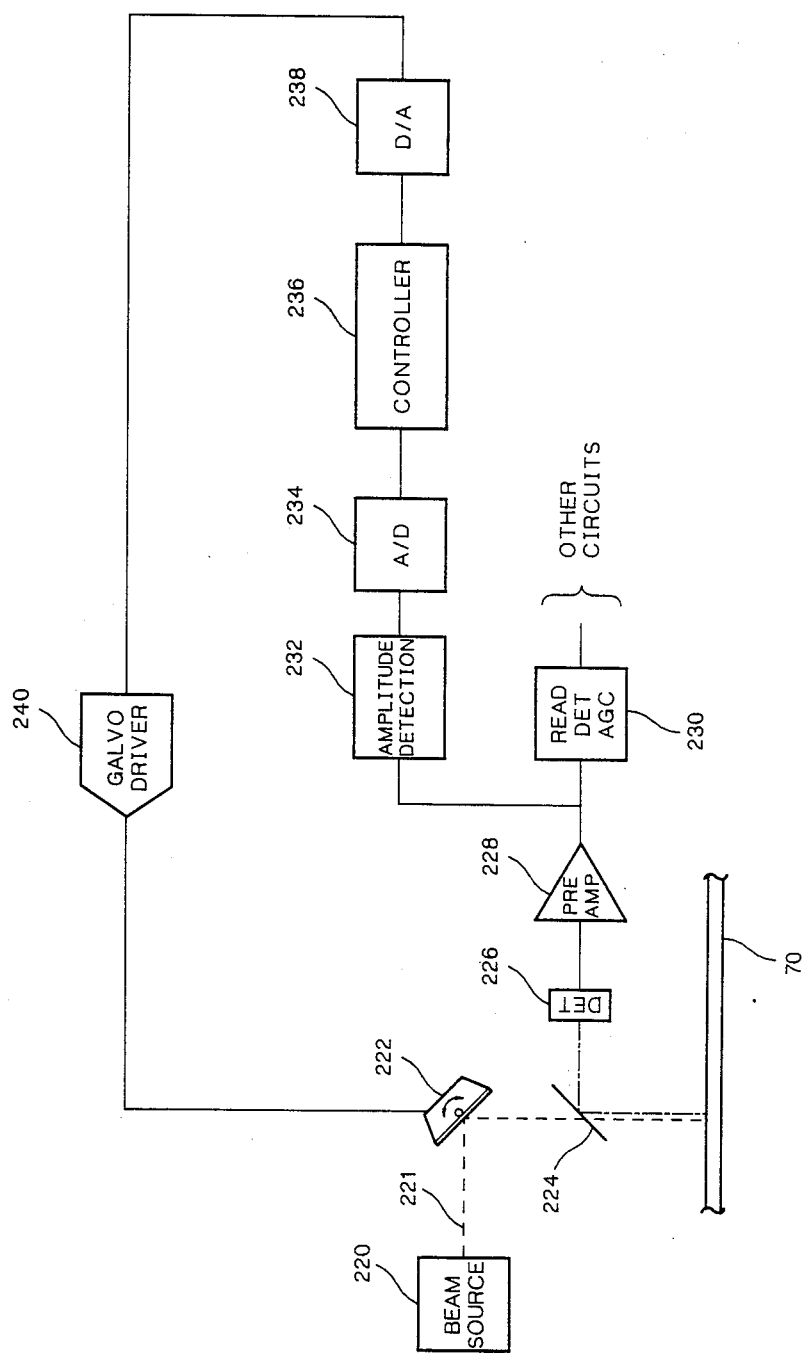
FIG. 8 is a conceptual block diagram of the present invention.

FIG. 8 is a simplified block diagram of the preferred embodiment of the present invention. Beam source 220 generates a radiation beam 221, shown as a dashed line, that is reflected off a galvonometer controlled mirror 222, and passes through a beam splitter 224 to form a spot on the disk 70. For clarity the defraction grating between the beam source and the galvonometer controlled mirror, which was shown in FIG. 2, has been omitted. The reflected beam, shown as a dash-dot line, is directed by the beam splitter 224 to the detector 226 where it is converted to an electrical signal. The electrical signal is amplified by the pre-amp circuit 228 and fed to the read detection and automatic gain control circuits 230 where it is decoded. The pre-amp circuit 228 output is also sent to the amplitude detection circuit 232 which smoothes the waveform and produces an output proportional to the electrical signal. The amplitude detection output is then converted from an electrical analog signal to a digital value by the A/D circuit 234 and fed to the controller circuit 236 where the value is stored for comparison to other values in determining the peak amplitude of the data read beam signal. The controller circuit output is converted from a digital value to an analog value by the D/A circuit 238 and amplified by the galvo driver circuit 240 to cause the galvonometer controlled mirror 222 to direct the beam position.

After initially setting track pitch using the method described earlier with FIGS. 6a, 6b and 7, and described more fully in copending application Ser. No. 06/628,686, the controller circuit 236 examines and stores the data read beam amplitude value and the galvonometer controlled mirror position. The controller circuit 236 then directs the galvonometer mirror 222 through the galvo driver circuit 240 and the D/A circuit 238 to move the data read beam a small increment in one direction, and stores the new value of the data read beam amplitude and mirror position. The controller circuit 236 then moves the data read beam another small increment and records another set of values. This process is repeated in both directions until a peak data read beam amplitude value is determined. The galvonometer controlled mirror position corresponding to the peak read beam amplitude is selected from the stored values and the data read beam is positioned accordingly at the position that produces the peak signal amplitude. Those skilled in the art will recognize that the controller circuit could be implemented using a commercially available microprocessor.

Figure 9:
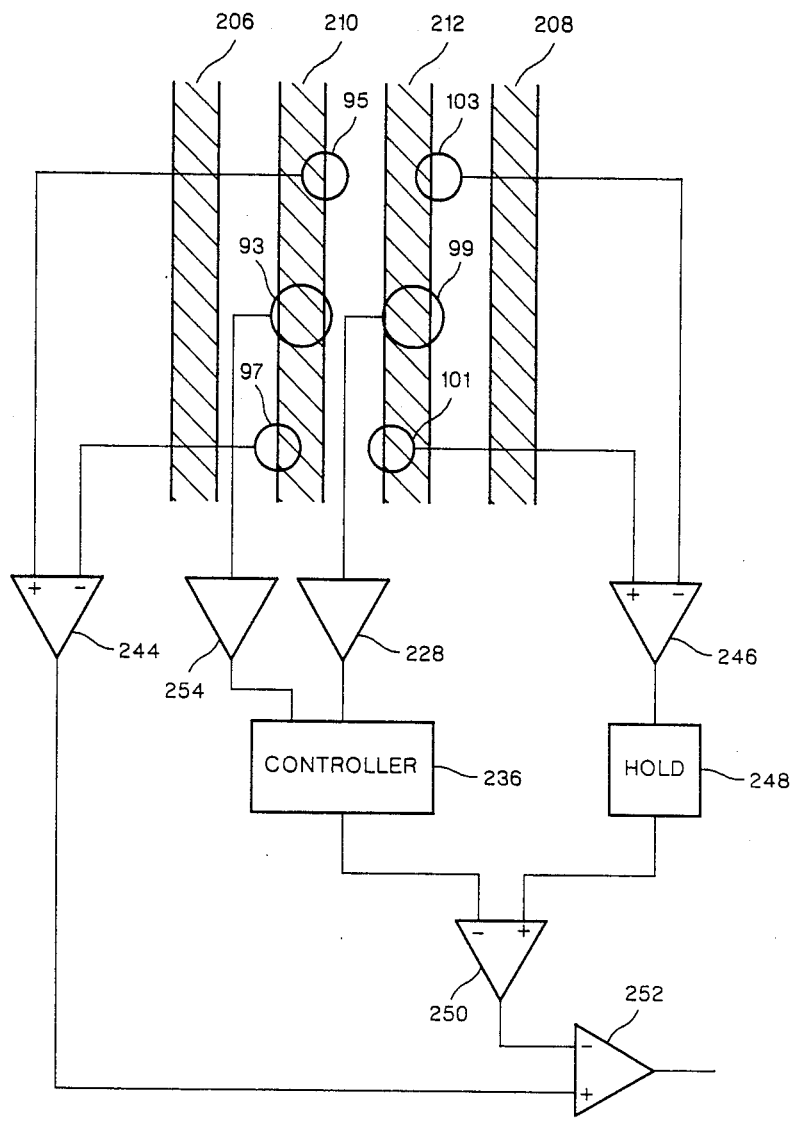
FIG. 9 is a block diagram illustrating how the alignment between the data read beam spot pattern and the two data tracks, or two calibration tracks, is measured.

Referring next to FIG. 9, the measurement of the track pitch offset $d_o$ is conceptually illustrated. The first group of tracking spots 95, 97 are aligned with the data track 210. Such alignment generally occurs when the spots 95 and 97 are half-on and half-off of the track, thereby creating a zero offset tracking signal out of the tracking amplifier 224. This tracking amplifier 224 compares the reflected radiant energy from spot 95 with the reflected radiant energy from spot 97. If the spots are aligned with the track (half-on and half-off), then these reflected radiant energies will cancel out. (In practice, the spot 95 may be somewhat misaligned with the spot 97, thereby making it impossible for both spots to be half-on and half-off of the track. Nonetheless, there will always be a position where the spots can be equally-on and equally-off of the track, thereby creating the null signal in the tracking amplifier 224.)

With the tracking spots 95 and 97 aligned with the track 210, the misalignment or offset associated with the tracking spots 101 and 103 relative to the track 212 is measured in tracking amplifier 246. As emphasized in FIG. 9, spot 101 is more on the track than is spot 103. This means that the reflected energy from spot 101 will be different than the reflected energy from spot 103, thereby creating an "offset" signal in the amplifier 246 that is proportional to the misalignment between the spot configuration 215 and the desired track pitch. This "offset" is held in a storage element 248, from which it can subsequently be retrieved for future use. The output of the storage element 248 is gated to amplifier 250 with the output of the controller 236 adjusted until a peak of the read signal from spot 99, as amplified by amplifier 228 is detected by the controller 236. For subsequent read operations, the stored value in the storage element 248 is combined with the controller 236 output by amplifier 250 and compared to the offset generated by amplifier 244 in amplifier 252. The spot configuration 215 is adjusted until the spots 95 and 97 have been shifted an amount equal to the combined offset of the stored value 248 and the controller output 236, which condition occurs when the output of amplifier 252 is nulled.

Alternatively, the read data beam may be located on the same track as the tracking read beams. In this instance, tracking spots 95 and 97 are aligned with the data track 210, in the same manner described above, to a position where the spots are equally-on and equally-off the track. Tracking spots 101 and 103 are adjusted to give a null offset which is stored in storage element 248. The output of the controller 236 is adjusted until a peak of the data read signal from spot 93, as amplified by amplifier 254 is detected by the controller 236. For subsequent read operations, the null value stored in storage element 248 is combined with the controller 236 output by amplifier 250 and compared to the offset generated by amplifier 244 in amplifier 252. The spot configuration 215 is adjusted until the spots 95 and 97 have been shifted an amount equal to the controller 236 output (since the storage element 248 holds a null value), which condition occurs when the output of amplifier 252 is nulled.

Figure 10:
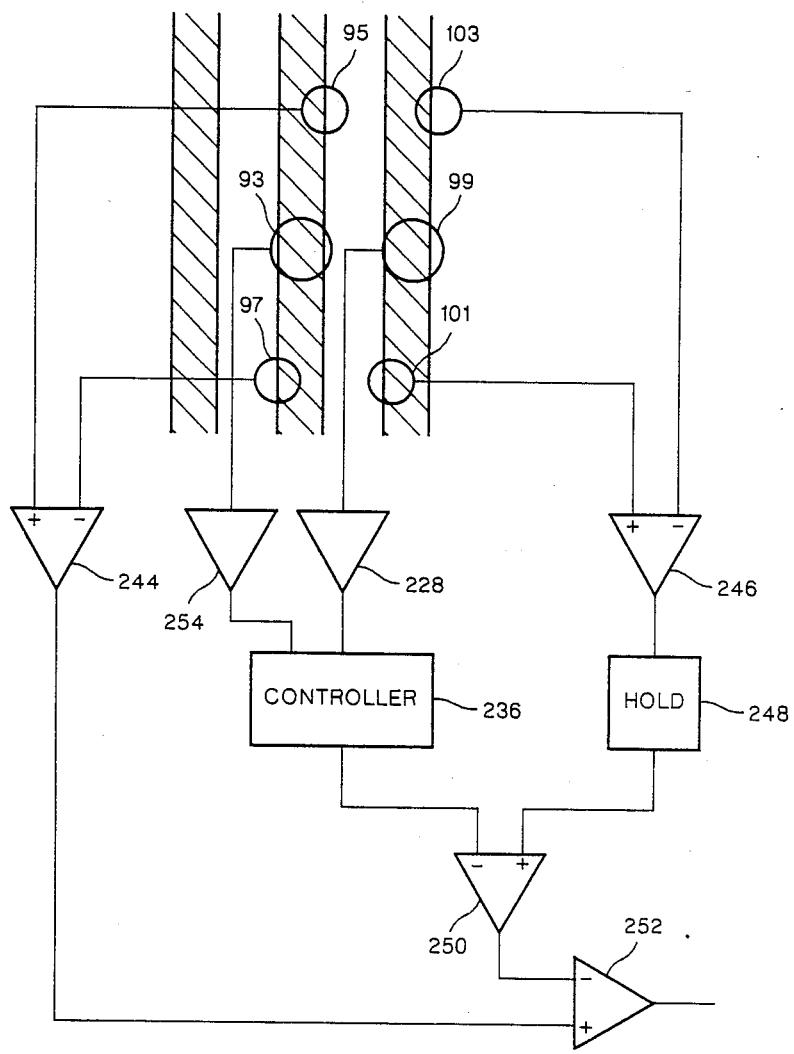
FIG. 10 illustrates how a second pair of calibration tracks, having a blank space on one side thereof, is used to properly calibrate the offset for subsequent operations.

This circuit acts identically when reading the last track on a band such that there is no track adjacent to the track being read, as shown in FIG. 10. However, the offset value stored in the storage element 248 and the peak value determined by the controller will be different from the values obtained as illustrated in FIG. 9, because there is no influence by the adjacent track on the amount of radiant energy by the spots 101, 103 and 99.

While the invention herein disclosed has been described by means of specific embodiment and applications thereof, numerous modifications and variations could be made thereto by those skilled in the art without departing from the spirit and scope of the present invention. Accordingly, it is to be understood that with the scope of the appended claims, the invention may be practiced otherwise than as specifically described herein.

What is claimed is:

1. In an optical storage system wherein information is stored by writing data in a data track on a recording medium, and data is read by detecting a data read beam modulated by data on said medium, a calibration system for positioning the data read beam at an optimum position over a data track comprising:

a first pair of calibration tracks placed on the recording medium during the manufacture thereof, having at least one data track adjacent to both sides thereof, the first pair of calibration tracks and adjacent tracks having a prescribed spacing or track pitch therebetween;

a second pair of calibration tracks placed on the recording medium during the manufacture thereof, having a data track adjacent to one side thereof but not the other side, the second pair of calibration tracks and adjacent data track having the prescribed track pitch therebetween;

means for measuring an amplitude of the data read beam and for generating an amplitude signal;

first means for optimizing the data read beam position over the second track of the first pair of calibration tracks while following the first track of the first pair of calibration tracks, the means being responsive to the amplitude signal, and for generating a first offset signal representative of the data read beam position; and second means for optimizing the data read beam position over the second track of the second pair of calibration tracks while following the first track of the second pair of calibration tracks, the means being responsive to the amplitude signal, and for generating a second offset signal representative of the data read beam position;

means for adjusting the data read beam position in subsequent read operations, said means being responsive to the first and second offset signals;

whereby the first offset signal provides an accurate displacement of the data read beam position for subsequent read operations with data tracks on either side of a data track being read; and the second offset signal provides an accurate displacement of the data read beam position for subsequent read operations with data tracks on only one side of a data track being read.

2. The data read beam calibration system of claim 1 wherein the first and second means for optimizing the data read beam position comprises:

a group of radiation beams selectively directed to the surface of the recording medium at the location where either the first or second pairs of calibration tracks are located, the beams having a prescribed physical relationship therebetween, the beams casting a fixed spot configuration on the surface of the medium;

third means for optically measuring the relative alignment of said first or second pairs of calibration tracks with respect to the fixed spot configuration; and means for converting the alignment measurement of the third means to the offset signal representative of the data read beam position.

3. The data read beam calibration system of claim 2 wherein said fixed spot configuration comprises a first group of spots that are spaced-apart a prescribed distance from a data read beam spot; and wherein said third optical measurement means includes:

means for aligning the first group of spots with one of the calibration tracks of the pair of calibration tracks being measured, and means for measuring the misalignment, if any, between the data read beam spot and the other of the calibration tracks of the pair of calibration tracks being measured.

4. The data read beam calibration system of claim 3 wherein said misalignment measurement means comprises:

conversion means for converting the amplitude signal to a value;

controller means for determining an optimum value; and means for converting the optimum value into an offset signal representative of the optimum data read beam position.

5. A data read beam calibration system for use in an optical storage system to insure that radiation beams directed to a surface of a recording medium used with said storage system are properly aligned with data tracks written on said recording medium, said storage system including means for following a previously written track with a first radiatiion beam, and means for positioning a data read radiation beam a desired distance from said first radiation beam in response to an offset signal, said data read beam calibration system comprising:

a plurality of calibration tracks written on the record carrier having a desired track pitch or distance therebetween;

means for optically measuring the data read beam location with respect to a calibration track and for generating an offset signal in response to the measurement; and means for positioning the data read beam in subsequent read operations, said means being responsive to the offset signal.

6. The data read beam calibration system of claim 5 further including storage means for storing the offset signal, whereby the optimum data read beam position is measured using the calibration tracks during an initialization or calibration mode of the optical storage system and the offset signal is thereafter readily available for positioning the data read beam relative to the first radiation beam in subsequent read operations.

7. The data read beam calibration system of claim 5 wherein said means for optically measuring the data read beam position with respect to the calibration tracks comprises:

means for aligning a first spot configuration from the first radiation beam with respect to a first of said calibration tracks; and means for measuring the misalignment of a data read spot configuration from the data read beam with respect to a second of said calibration tracks, said data read beam being spaced apart from the first set of radiation beams.

8. The data read beam calibration system of claim 7 wherein the means for optically measuring the data read beam position measures the position using a center pair of calibration tracks located in the center of the set of calibration tracks, at least one additional calibration track being on either side of the center pair, whereby the offset signal generated in response to the data read beam position measurement of the center pair of calibration tracks includes therein the optical effects of having adjacent tracks on both sides of the center pair of calibration tracks.

9. The data read beam calibration system of claim 5 wherein the means for optically measuring the data read beam position measures the position using an outer pair of calibration tracks located at an outer edge of the set of calibration tracks, at least one additional calibration track being on an inner side of the outer pair of calibration tracks, and no additional calibration tracks being on an outer side of said outer pair of calibration tracks, whereby the offset signal generated in response to the data read beam position measurement of the outer pair of calibration tracks includes therein the optical effects of having an adjacent track on one side but not the other of said outer pair of calibration tracks.

10. The data read beam calibration system of claim 9 wherein the offset signal is used to align the first radiation beam and the data read beam of said optical storage system when the first radiation beam is following a first previously written data track and the data read beam is reading the last data track of a band adjacent said first previously written data track such that no data track has been written outside the data track being read.

11. The data read beam calibration system of claim 5 wherein said means for optically measuring the data read beam position with respect to the calibration tracks comprises:

means for aligning a first spot configuration from the first radiation beam with respect to a first of said calibration tracks; and means for measuring the misalignment of a data read spot configuration from the data read beam with respect to said first calibration track.

12. The data read beam calibration system of claim 11 wherein the means for optically measuring the data read beam position measures the position using an outer calibration track located at an outer edge of the set of calibration tracks, at least one additional calibration track being on an inner side of the outer calibration track, and no additional calibration tracks being on an outer side of said outer calibration track, whereby the offset signal generated in response to the data read beam position measurement of the outer calibration track includes therein the optical effects of having an adjacent track on one side but not the other side of said outer calibration track.

13. A method of accurately measuring the location of a data read beam in an optical storage system, the system including a recording medium upon which data tracks are optically written, the recording medium having at least one data track previously written thereon, and the storage system including means for having a first radiation beam follow a previously written data track, and means for positioning the data read beam a desired distance from the first radiation beam in response to an offset signal, said method comprising the steps of:

(a) placing a set of at least four calibration tracks on the recording medium having the prescribed track pitch therebetween;

(b) measuring the optimum position of the data read beam over one of a select pair of the calibration tracks with respect to the other track of the select pair of calibration tracks; and (c) generating an offset signal as a function of the measurement made in step (b).

14. The method of claim 13 wherein step (b) further comprises the steps of:

(1) locating the first radiation beam over the first of the select pairs of calibration tracks;

(2) measuring the amplitude of the data read beam;

(3) moving the data read beam a substantially small distance in one or another direction; and (4) repeating steps (2) and (3) until a maximum amplitude is obtained;

whereby an optimum data read beam position is obtained by iterating steps (2) and (3) until the amplitude is at a maximum.

15. The method of claim 14 further including:

(d) storing the offset signal generated in step (c), whereby steps (b) and (c) need only be performed during an initialization or calibration mode of the optical storage system and the offset signal is thereafter readily available for positioning the data read beam the desired distance from the first radiation beam.

16. The method of claim 13 wherein the select pair of calibration tracks used in step (b) comprises an inner pair of tracks having additional tracks adjacent to both sides thereof, the offset signal generated in step (c) thus having included therein the optical effects of having data tracks adjacent to both sides of the select pair of calibration tracks.

17. The method of claim 13 wherein the select pair of calibration tracks used in step (b) comprises an outer pair of tracks having an additional track adjacent an inner side thereof but having no tracks adjacent on outer side thereof, the offset signal generated in step (c) thus having included therein the optical effects of having additional track adjacent one side but not the other side of the select pair of calibration tracks.

* * * * *